(12) United States Patent
Kim et al.

(10) Patent No.: US 12,531,105 B2
(45) Date of Patent: Jan. 20, 2026

(54) TIMING CIRCUIT HAVING TUNED TEMPERATURE DEPENDENCY

(71) Applicant: Micron Technology, Inc., Boise, ID (US)

(72) Inventors: Si Hong Kim, Boise, ID (US); Ki-Jun Nam, Boise, ID (US); Zhi Qi Huang, Shanghai (CN); John David Porter, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 326 days.

(21) Appl. No.: 17/922,199

(22) PCT Filed: May 29, 2020

(86) PCT No.: PCT/CN2020/093379
§ 371 (c)(1),
(2) Date: Oct. 28, 2022

(87) PCT Pub. No.: WO2021/237705
PCT Pub. Date: Dec. 2, 2021

(65) Prior Publication Data
US 2023/0178139 A1    Jun. 8, 2023

(51) Int. Cl.
*G11C 11/4076* (2006.01)
(52) U.S. Cl.
CPC ................ *G11C 11/4076* (2013.01)
(58) Field of Classification Search
CPC ....... G11C 11/4076; H03K 5/06; H03K 5/082
(Continued)

(56) References Cited

U.S. PATENT DOCUMENTS

| 7,515,669 B2* | 4/2009 | Shiah | H04L 7/033 326/82 |
| 7,642,833 B1* | 1/2010 | Smith | H03H 11/54 327/288 |
| 10,340,903 B2 | 7/2019 | Lee et al. | |

FOREIGN PATENT DOCUMENTS

| CN | 101567680 A | 10/2009 |
| CN | 107179877 A | 9/2017 |

(Continued)

OTHER PUBLICATIONS

"International Application Serial No. PCT/CN2020/093379, International Search Report mailed Feb. 25, 2021", 5 pgs.
(Continued)

*Primary Examiner* — Menatoallah Youssef
*Assistant Examiner* — Colleen J O Toole
(74) *Attorney, Agent, or Firm* — Schwegman Lundberg & Woessner, P.A.

(57) ABSTRACT

A system (100) for providing a timing signal with tunable temperature dependency in an electronic device may include a timing circuit (102) and an initial setting circuit (104). The timing circuit (102) may include a delay stage (106) and a gate stage (108). The delay stage (106) may be configured to receive an input signal and to produce a delayed signal by introducing a delay to the input signal. The gate stage (108) may be configured to receive the delayed signal and a threshold setting signal, to produce an output signal using the delayed signal and a logic threshold, and to set an initial value of the logic threshold according to the threshold setting signal. The initial setting circuit (104) may be configured to allow the threshold setting signal to be tuned for providing the time delay with a specified temperature dependency.

22 Claims, 10 Drawing Sheets

(58) Field of Classification Search
USPC .......................... 327/138, 158, 161, 261, 262
See application file for complete search history.

(56) References Cited

FOREIGN PATENT DOCUMENTS

| | | | | |
|---|---|---|---|---|
| CN | 109710015 A | 5/2019 | | |
| WO | WO-2020024149 A1 * | 2/2020 | ........... | G11C 11/408 |
| WO | WO-2021237705 A1 | 12/2021 | | |

OTHER PUBLICATIONS

"International Application Serial No. PCT/CN2020/093379, Written Opinion mailed Mar. 25, 2021", 4 pgs.

* cited by examiner

TIMING CIRCUIT HAVING TUNED TEMPERATURE DEPENDENCY

PRIORITY APPLICATION

This application is a U.S. National Stage Application under 35 U.S.C. 371 from International Application No. PCT/CN2020/093379, filed 29 May 2020, published as WO 2021/237705, which is incorporated herein by reference in its entirety.

TECHNICAL FIELD

The subject disclosure relates to timing circuits having tuned temperature dependency.

BACKGROUND

Timing circuits are used in an electronic device or system for controlling timing of various operations. One example is a timing circuit in a memory device for controlling timing for sensing a state of the data bit stored in each memory cell of the memory device. Such a timing circuit may introduce a time delay to a digital control signal. The time delay is known to have dependency on the temperature at which the device or system including the timing circuit operates. A target circuit in the device or system that receives and uses an output of the timing circuit may also have temperature-dependent characteristics. Such temperature dependencies of different circuits in the device or system need to be properly coordinated. There is a need for keeping each critical timing signal or parameter, such as a time delay, of the device or system within its tolerance or desirable range over temperature variations experienced during the operation of the device or system.

BRIEF DESCRIPTION OF THE DRAWINGS

In the drawings, which are not necessarily drawn to scale, like numerals may describe similar components in different views. The drawings illustrate generally, by way of example, but not by way of limitation, various embodiments discussed in the present document.

DETAILED DESCRIPTION

Figure 1:
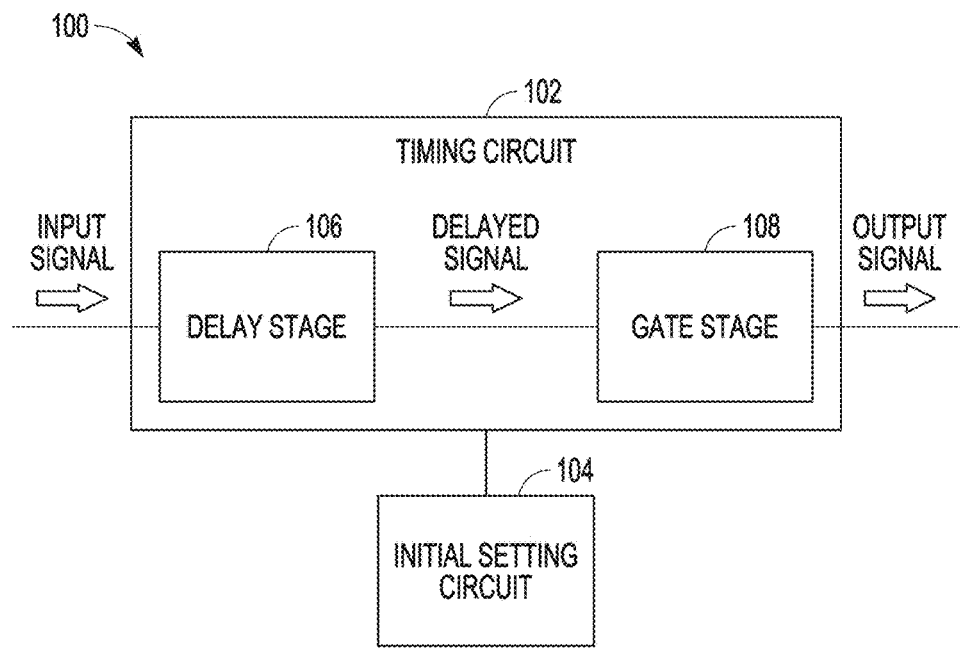
FIG. 1 is a block diagram illustrating an embodiment of a system for providing a timing signal with tunable temperature dependency.

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that the embodiments may be combined, or that other embodiments may be utilized and that structural, logical and electrical changes may be made without departing from the spirit and scope of the present invention. References to "an", "one", or "various" embodiments in this disclosure are not necessarily to the same embodiment, and such references contemplate more than one embodiment. The following detailed description provides examples, and the scope of the present invention is defined by the appended claims and their legal equivalents.

This document discusses, among other things, a timing circuit providing for a digital signal with a time delay that is accurate and can be tuned to substantially follow a time delay of its target circuit over anticipated temperature variations. The target circuit can include a circuit that uses an output of the timing circuit, such as a memory circuit using a signal for controlling timing of sensing. In a mixed signal circuit, a critical time interval, such as a sensing margin in a memory circuit, can have a positive temperature coefficient (time interval increasing with increasing temperature) or a negative temperature coefficient (time interval decreasing with increasing temperature). When the time intervals of the delay circuit and the target circuit have substantially matching temperature coefficients, timing parameters controlling operations of a system (e.g., including circuitry of a memory device) can be achieved.

The present subject matter can provide a timing circuit that can be adjusted for a required or desirable temperature dependency during manufacturing of a device that includes the timing circuit, thereby eliminating the need for adjusting temperature dependency during post-manufacturing operation of the device. The timing circuit can include a delay stage and a gate stage. The gate stage has a variable logic threshold that can be set during manufacturing for a desired temperature coefficient. By adjusting at least the logic threshold, the timing circuit can be tuned to provide a delay between its input signal and its output signal with a desirable temperature coefficient. This temperature dependency can be specified to allow for optimization of parameters controlling timing of various signals and operations in a device or system.

The delay stage can include any circuit that provides a delay to a signal and can be placed before or after the gate stage. The delay stage can be adjustable to allow for additional control on the overall delay between the input signal and the output signal of the timing circuit, including control on the temperature coefficient of the overall delay.

In various embodiments, the timing circuit can include a resistive-capacitive (RC) delay stage followed by the gate stage having the variable logic threshold. The RC delay stage produces a ramping voltage signal having a time constant ($\tau$) being the product of a resistance and a capacitance ($\tau=RC$) that can be set during manufacturing by adjusting the resistance (R) and/or the capacitance (C). The time constant and the logic threshold each have a temperature coefficient. By adjusting the timing constant and the logic threshold, the timing circuit can be tuned to provide a delay between its input signal and its output signal with a desirable temperature coefficient.

While the RC delay stage is specifically discussed in this document as an example, various embodiments can use any type of delay circuit as the delay stage. Another example of the delay stage includes one or more gates (e.g., one or more inverters). The number of gates can be determined to provide a desired delay between the input signal and the output signal of the delay stage. The delay stage can have a variable delay that can be set during manufacturing by selecting the number of gate to permanently include for the desired delay.

Many forms of memory devices may evidence some form of temperature dependency, resulting from one or more functionalities that can vary as a function of temperature. For example, some memories, in some examples volatile memories, may experience a difference in retention time and/or programming time in response to changes in temperature. In various forms of memory devices may require adjustment of various voltages, for example read and/or write voltages in order to compensate for physical changes resulting from changes in temperature. Conventionally, memory devices may include relatively complex systems to monitor and modify operational parameters in response to temperature. Such memory devices may include, by way of non-limiting example only, both volatile and non-volatile memory. Volatile memory requires power to maintain its data, and includes random-access memory (RAM), in various forms, such as dynamic random-access memory (DRAM), synchronous dynamic random-access memory (SDRAM), static RAM (SRAM), among others. Non-volatile memory may retain stored data when not powered, and may include one or more storage technologies, such as flash memory (e.g., NAND or NOR flash), electrically erasable programmable ROM (EEPROM), Ferroelectric RAM (Fe-RAM), erasable programmable ROM (EPROM), resistance variable memory, such as phase-change random-access memory (PCRAM), resistive random-access memory (RRAM), magnetoresistive random-access memory (MRAM), or 3D XPoint™ memory, among others.

As one illustrative example, RAS (Row Address Strobe) timing in a memory device may include delays with various temperature coefficients. The present subject matter can allow for setting of proper temperature coefficients for such delays. The temperature coefficients can be calibrated by fuse trimming during a test stage in the manufacturing of a device for an intended operation of the device. No post-manufacturing calibration is needed during the operation of the device.

FIG. 1 is a block diagram illustrating an embodiment of a system 100 for providing a timing signal with tunable temperature dependency. System 100 can include a timing circuit 102 and an initial setting circuit 104. Timing circuit 100 can receive an input signal and produce an output signal by applying a time delay to the input signal. Timing circuit 102 can include a delay stage 106 and a gate stage 108. Delay stage 106 can produce a delayed signal by introducing a delay to the input signal. Gate stage 108 can receive the delayed signal and produce the output signal using the delayed signal and a logic threshold. Gate stage 108 can also receive a threshold setting signal and set an initial value of the logic threshold according to the threshold setting signal. Initial setting circuit 104 can provide the threshold setting signal and allow the threshold setting signal to be tuned for providing the time delay with a specified temperature dependency.

In one embodiment, delay stage 106 produces the delayed signal by introducing an RC delay to the input signal. Delay stage 106 can receive a delay setting signal and set an initial value of a time constant according to the delay setting signal. The time constant ($\tau$) is a measure of the RC delay (and may also be referred to as the RC delay). Initial setting circuit 104 can provide both threshold setting signal and the delay setting signal and allow the threshold setting signal and the delay setting signal to be tuned for providing the time delay with the specified temperature dependency. This allow for a "2-dimensional tuning" (i.e., tuning of the time constant and the logic threshold) of the temperature dependency of the time delay. Delay stage 106 can be tuned to provide the time constant with a positive time dependency or a negative time dependency by adjusting the delay setting signal. Gate stage 108 can be tuned to provide the logic threshold with a positive time dependency or a negative time dependency by adjusting the threshold setting signal. As a result, system 100 can be tuned for providing the time delay with a negative temperature dependency or a positive temperature dependency by adjusting the threshold setting signal and/or the delay setting signal.

In one embodiment, initial setting circuit 104 allows the threshold setting signal and the delay setting signal to be adjusting by fuse trimming, such as during a test mode of manufacturing of an electronic device including system 100. Fuse trimming can refer to a process during which a low-resistance path is permanently broken, such as to break an electrical connection in a circuit. For example, a digital input can include multiple bit lines each connected to binary voltage levels using a fuse in a manner allowing the bit to be set to one of the binary levels permanently such that the digital input can be set to a desirable value by selectively trimming (blowing) the fuses. In various embodiments, a "fuse" can include a non-volatile register, such as a non-volatile register inside a memory device (e.g., a DRAM device) that is used for an internal setting of the memory device. The threshold setting signal and the delay setting signal can each be a binary code with each digit set to "0" or "1" and stored in a non-volatile register during the "fuse trimming".

Figure 2:
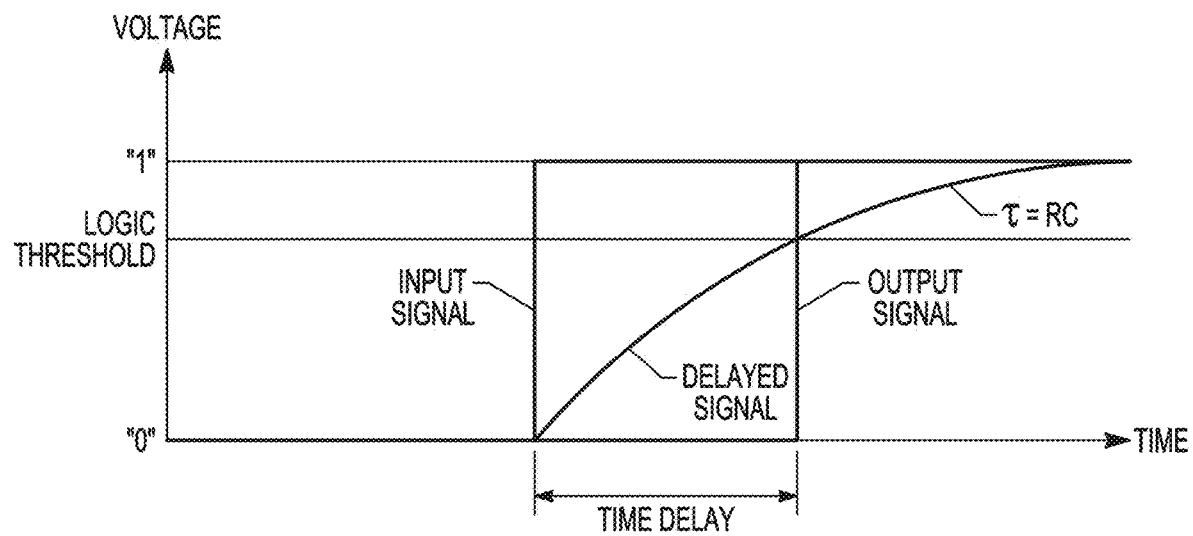
FIG. 2 is a graph illustrating of an example of signals of a timing circuit, such as the timing circuit of FIG. 1.

FIG. 2 is a graph illustrating of an example of signals of a timing circuit including a delay stage and a gate stage, such as timing circuit 102. The graph shows an input signal, a delay signal, and an output signal that correspond to, respectively, the input signal, the delay signal, and the output signal of timing circuit 102 as shown in FIG. 1. When the input signal changes its logic level (from "0" to "1" as shown), the delayed signal changes its logic level with a time constant τ=RC, wherein R and C are the resistance and the capacitance of the delay stage that provides the time constant. The output changes its logic level (from "0" to "1" as shown) when the delayed signal crosses (exceeds as shown) the logic threshold of the gate stage. The time constant and the logic thresholds determine the time delay, which is the time it takes for the output signal to change its logic level in response to the change of logic level in the input signal.

Figure 3:
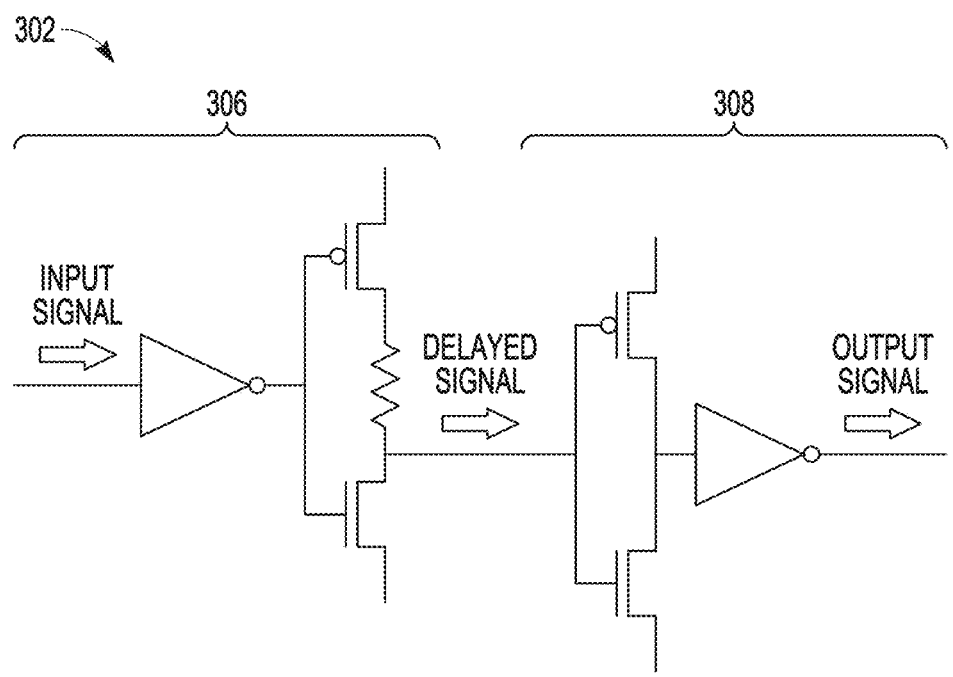
FIG. 3 is a circuit diagram illustrating an example of a concept for a timing circuit, such as the timing circuit of FIG. 1.

FIG. 3 is a circuit diagram illustrating an example of a timing circuit 302. Timing circuit 302 can represent an example showing a concept of how a timing circuit, such as timing circuit 102, works. The input signal, the delay signal, and the output signal as illustrated in FIG. 2 also correspond to, respectively, the input signal, the delay signal, and the output signal of timing circuit 302 as shown in FIG. 3.

Timing circuit 302 receives an input signal and produces an output signal by applying a time delay to the input signal. In various embodiments, timing circuit 302 is used in an electronic device or system that includes a target circuit (e.g., a target circuit 1352 shown in FIG. 13) that receive the output signal and to control timing of an operation of the device or system using the output signal. Timing circuit 302 has a tunable temperature coefficient. That is, the time delay of the output signal has a temperature coefficient and timing circuit 302 is configured to allow that temperature coefficient to be turned. In one embodiment, timing circuit 302 is configured to be tuned to provide the time delay with the temperature coefficient during manufacturing of the device or system, such as by fuse trimming. In this document, the temperature coefficient of the timing circuit, the temperature coefficient of the output signal, and the temperature coefficient of the time delay refer to the same temperature coefficient, which is a measure of the temperature dependency of the time delay. The time delay is the parameter to be controlled using the timing circuit.

Timing circuit 302 includes a delay stage 306 that produces the delayed signal by introducing an RC delay to the input signal. The RC delay can be measured by the time constant τ=RC, where R represents the resistance of delay stage 306 that contributes to the time constant and C represents the capacitance of delay stage 306 that contributes to the time constant. In various embodiments, delay stage 30 can include any type of RC delay circuit (including but not limited to the examples in this document) being a circuit that produces the delay signal, with an overall resistance R and overall capacitance C providing for the time constant τ=RC. This time constant (which may also be referred to as the RC delay) can be referred to as the time constant (or RC delay) of the delayed stage or the delayed signal. Delay stage 306 receives a delay setting signal (such as the delay setting signal produced by initial setting circuit 104) and sets an initial value of the time constant τ by adjusting at least one of the resistance R or capacitance C according to the delay setting signal. In one embodiment, the resistance R is adjustable by using an electronically trimmable resistor. While a passive resistor has a positive temperature coefficient, an active (semiconductor-type) resistor can be used if a resistance with a negative temperature coefficient is desired. In one embodiment, the capacitance C is adjustable by using an electronically trimmable capacitor, which can include a capacitor and/or capacitances of transistors in the delay stage. In various embodiments, at least one of the resistance R and capacitance C is adjustable, such that the time constant τ has a temperature coefficient being a function of the timing coefficients of the resistance R and/or the capacitance C.

Figure 4:
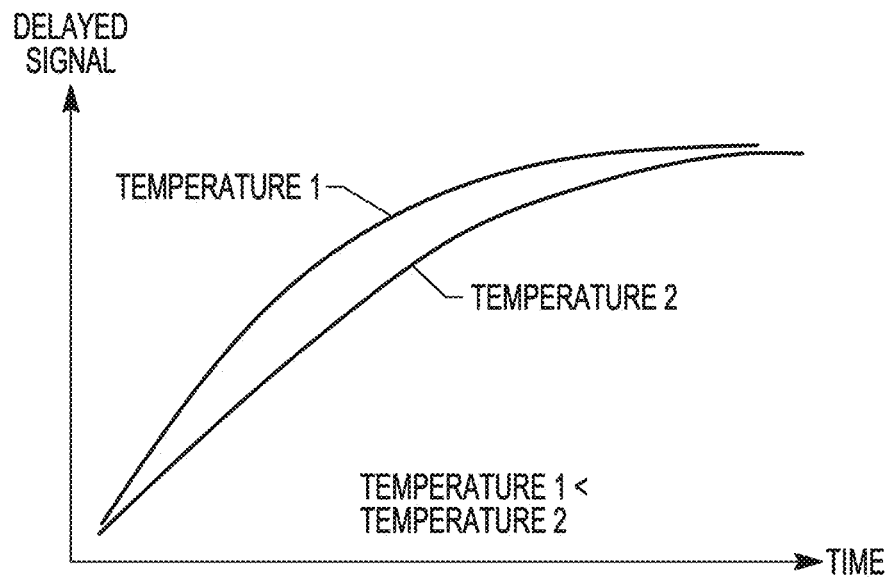
FIG. 4 is a graph illustrating of an example of a delayed signal in a timing circuit, such as the timing circuit of FIG. 1.

FIG. 4 is a graph illustrating of an example of the delayed signal in a timing circuit, such as timing circuit 306. The graph shows a rising portion of the delayed signal at two different temperatures. The difference contributes to the difference of the time delay in the output signal at different temperatures.

Figure 5:
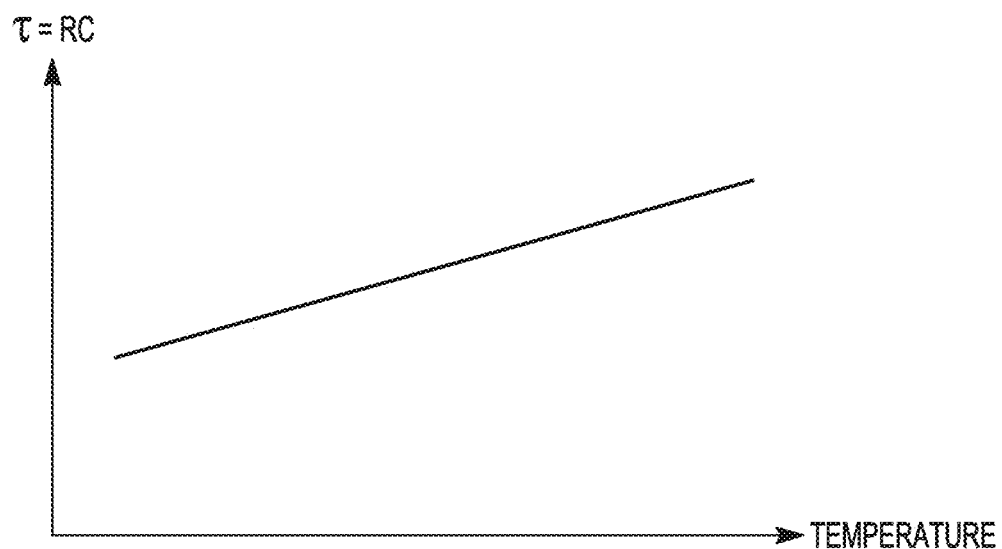
FIG. 5 is a graph illustrating of an example of a time constant of the delayed signal of FIG. 4.

FIG. 5 is a graph illustrating of an example of a time constant of the delayed signal of FIG. 4. In the illustrated example, the time constant has a positive temperature coefficient.

Delay stage 306 can have a positive temperature dependency (e.g., because a simple resistor is used) or a negative temperature dependency (e.g., when a semiconductor-type resister is used). However, it is difficult to calibrate the temperature dependency of the time constant for a desirable target because the practical limits in electronically adjusting the resistance and/or the capacitance. On the other hand, the logic threshold of gate stage 308 can be adjusted for a wide range of positive and negative temperature dependencies, allowing for the time delay in the output signal to be calibrated for a desirable temperature dependency (e.g., substantially matching the temperature dependency of one or more signals in the target circuit).

Referring back to FIG. 3, gate stage 308 receives the delayed signal from delay stage 306 and produce the output signal using the delayed signal and a logic threshold. Gate stage 308 switches the output signal to a different logic level in response to the delayed signal crossing the logic threshold (e.g., switches the output signal from "0" to "1" in response to the delayed signal exceeding the logic threshold, as illustrated in FIG. 2). Gate stage 308 includes threshold setting circuitry that receives a threshold setting signal (such as the threshold setting signal produced by initial setting circuit 104) and sets the logic threshold to an initial value according to the threshold setting signal.

In various embodiments, the initial value of the logic threshold can be set for a specified process such that timing circuit 302 has a proper temperature dependency during the specified process. The process can include the operation of the target circuit controlled using the output signal of timing circuit 302. The proper temperature dependency can be a target temperature dependency determined for the process, for example, to ensure that errors in the time interval(s) resulting from temperature variations are within a tolerance range specified for the process. The target temperature dependency can be measured or specified by a temperature coefficient to which the temperature coefficient of the output signal of timing circuit 302 is to be substantially matched. In this document, "substantially matched" can mean practical result of a value matching that is limited by factors including, but not limited to, resolution in digital control and errors within manufacturing tolerances.

Figure 6:
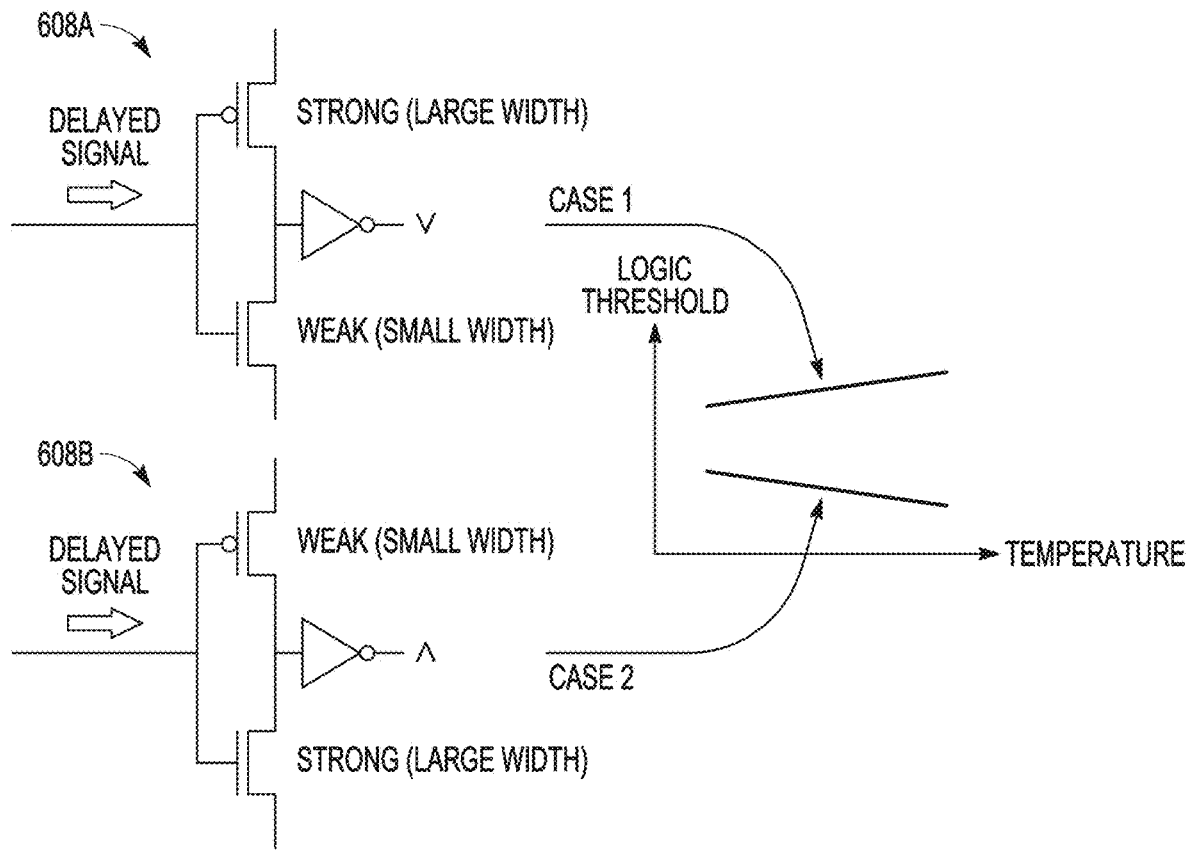
FIG. 6 is an illustration of an example of characteristics of a gate stage in the timing circuit of FIG. 3, including circuit diagrams illustrating two examples of the gate stage and a graph showing logic thresholds corresponding to the two examples.

FIG. 6 is an illustration of an example of characteristics of gate stage 308, including circuit diagrams illustrating two examples of the gate stage (shown as gate stages 608A and 608B) and a graph showing logic thresholds corresponding to the two examples. FIG. 6 shows that different logic thresholds can result from different transistor characteristics. The illustrated example shows a logic threshold having a positive temperature coefficient ("case 1", corresponding to gate stage 608A) and a logic threshold having a negative temperature coefficient ("case 2", corresponding to gate stage 608B).

Figure 7:
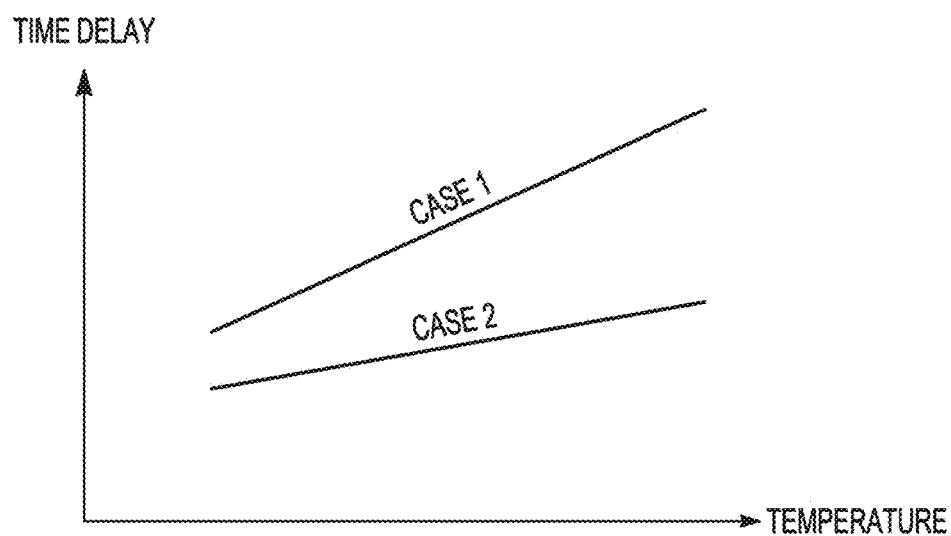
FIG. 7 is a graph illustrating of an example of time delays of the timing circuit of FIG. 3 corresponding to the two examples of FIG. 6.

FIG. 7 is a graph illustrating of an example of time delays of timing circuit 308 corresponding to the two examples of FIG. 6. The time delay has a temperature coefficient (i.e., an overall effect) resulting from the temperature coefficient of the time constant as shown in FIG. 5 and the temperature coefficient of the logic threshold as shown in FIG. 6. In various embodiments, the temperature coefficient of the time delay of timing circuit 302 (which may also be referred to as the temperature coefficient of the output signal of timing circuit 302 or the temperature coefficient of timing circuit 302) can be tuned by setting the initial value of the time constant and the initial value of the logic threshold. Such a 2-dimensional calibration provides for a wide range of values of the temperature coefficient available for tuning the temperature coefficient of the time delay.

Figure 8:
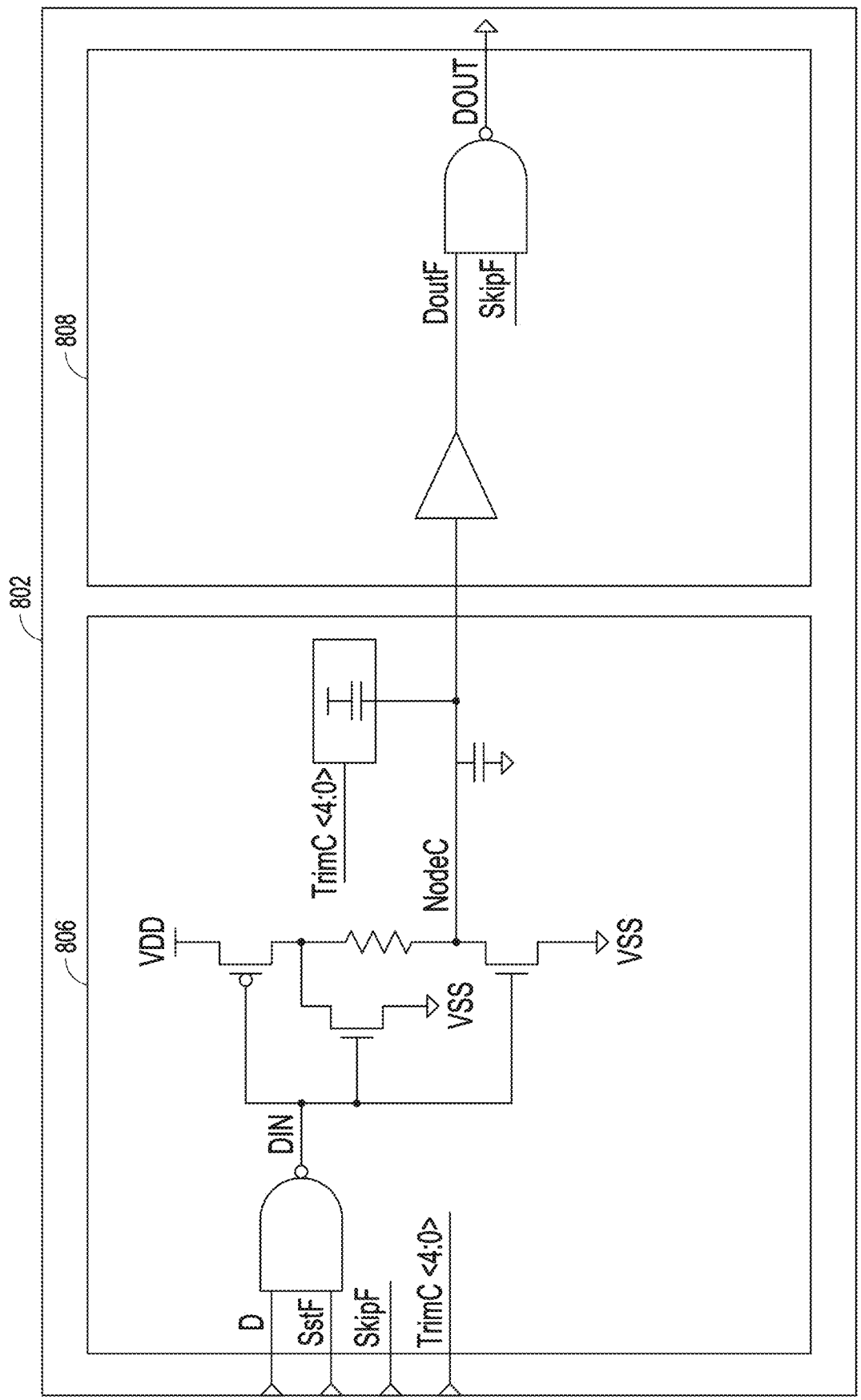
FIG. 8 is a circuit diagram illustrating an embodiment of a timing circuit, such as the timing circuit of FIG. 1.

FIG. 8 is a circuit diagram illustrating an embodiment of a timing circuit 802, which can represent an example of implementation of timing circuit 102 with a delay stage 806 having a tunable time constant and a gate stage 808 having a fixed logic threshold. In the illustrated embodiment, delay stage 806 includes an electronically trimmable capacitor with its capacitance adjustable using a delay setting signal TrimC<4:0>, which is a 5-bit binary code allowing for selection of 32 values of the capacitance. In one embodiment, TrimC<4:0> is set by fuse trimming under a test mode during manufacturing of the electronic device or system that includes timing circuit 802.

In the illustrated embodiment, the temperature coefficient of the time delay of timing circuit 802 is tunable by adjusting TrimC<4:0>, and hence, is limited by the adjustable range of the electronically trimmable capacitor. In another embodiment, the resistor in delay stage 806 can be an electronically trimmable resistor. The resistor can be a semiconductor type resistor for a temperature dependency that is not achievable with a passive resistor. In various embodiments, delay stage 806 can include an electronically trimmable capacitor and/or an electronically trimmable resistor to provide the delayed signal with a time constant that can be tuned for a positive or negative temperature coefficient.

Gate stage 808 has a fixed logic threshold and hence a fixed temperature dependency. Thus, the overall tunable range of the temperature dependency of timing circuit 802 is limited by the tunable range of delay stage 806 provided by the electronically trimmable capacitor and/or the electronically trimmable resistor. This overall tunable range can be substantially expanded by making the logic threshold of the gate stage tunable, as discussed below with reference to FIG. 9.

Figure 9:
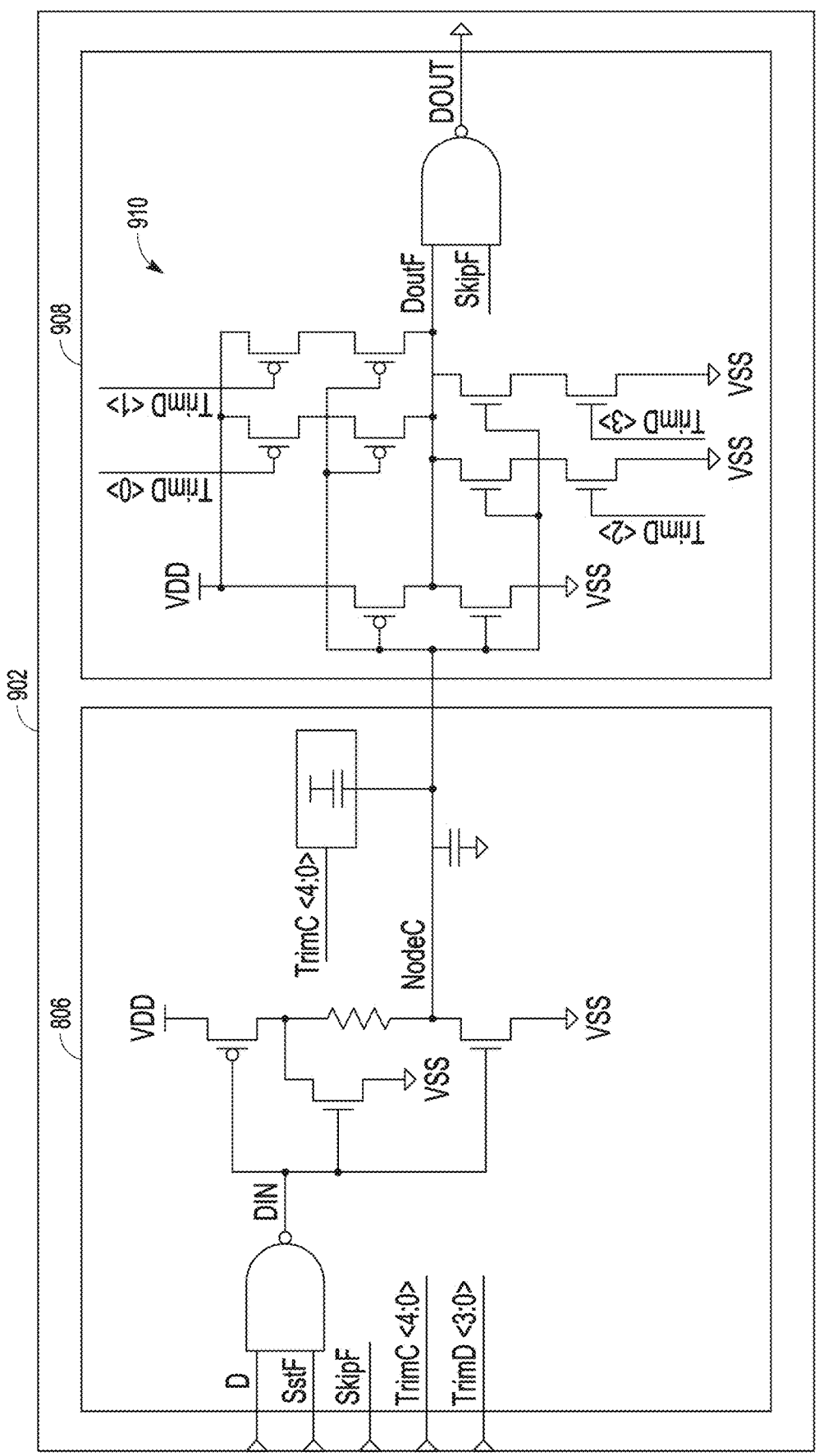
FIG. 9 is a circuit diagram illustrating another embodiment of a timing circuit, such as the timing circuit of FIG. 1.

FIG. 9 is a circuit diagram illustrating an embodiment of a timing circuit 902, which can represent an example of implementation of timing circuit 102 with a delay stage 806 having the tunable time constant and a gate stage 908 having a tunable logic threshold. Thus, timing circuit 902 has the same delay stage as timing circuit 802 but a different gate stage that provides a wider range of control over the temperature coefficient of the time delay.

In the illustrated embodiment, gate stage 908 includes threshold setting circuitry 910 including pull-up and pull-down transistors that can be digitally controlled using a threshold setting signal TrimD<3:0>, which is a 4-bit binary code allowing for selection of 16 values of the logic threshold. The temperature coefficient of the time delay of timing circuit 902 is tunable by adjusting TrimC<4:0> and/or TrimD<3:0>. In another embodiment, delay stage 806 can be a fixed circuit without a tunable time constant, and the temperature coefficient of the time delay of timing circuit 902 is tunable by adjusting TrimD<3:0> alone. In one embodiment, TrimC<4:0> and TrimD<3:0> are set by fuse trimming under a test mode during manufacturing of the electronic device or system that includes timing circuit 902.

In various embodiments, the delay setting signal can have any number of digits that provides for a desirable resolution and range of control on the time constant of delay stage 806, and the threshold setting signal can have any number of digits that provides for a desirable resolution and range of control on the logic threshold of gate stage 908. The desirable resolution and range of control on the time constant and the desirable resolution and range of control on the logic threshold are dependent on the desirable resolution and range of control on the temperature coefficient of the time delay in the output signal of timing circuit 902.

Figure 10:
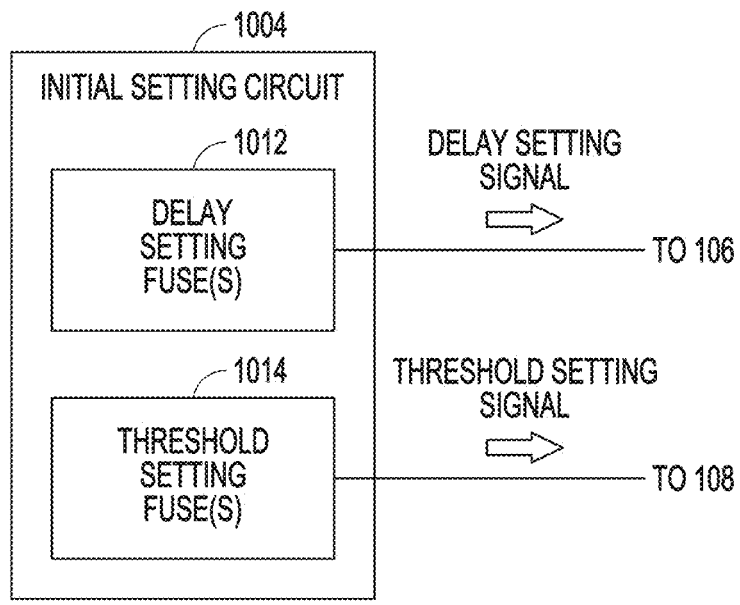
FIG. 10 is a block diagram illustrating an embodiment of an initial setting circuit, such as the initial setting circuit of FIG. 1.

FIG. 10 is a block diagram illustrating an embodiment of an initial setting circuit 1004, which can represent an example of initial setting circuit 104. In the illustrated embodiment, initial setting circuit 1004 includes one or more delay setting fuses 1012 and one or more threshold setting fuses 1014. In various embodiments, depending on the need for each of the delay setting signal and the threshold setting signal, initial setting circuit 1004 can include one or more delay setting fuses 1012 and/or one or more threshold setting fuses 1014. Initial setting circuit 1004 can provide the delay setting signal and/or the threshold setting signal to a timing circuit such as timing circuit 102 (including, but not limited to, its various examples as discussed in this document).

Delay setting fuse(s) 1012 can provide the delay setting signal and allow the delay setting signal to be tuned to provide the time constant of delay stage 106 (including, but not limited to, its various examples as discussed in this document) with a desired temperature coefficient. In various embodiments, the delay setting signal is a binary code adjusted for the desired temperature coefficient by fuse trimming during manufacturing of the device including initial setting circuit 1004 and the timing circuit that receives the binary code. In one embodiment, delay setting fuse(s) 1012 are each a non-volatile register, and the fuse trimming refers to the process of determining a value for the binary code and store the determined value in the non-volatile register(s). In various embodiments, the delay setting signal can be an N-bit binary signal (providing $2^N$ initial values to which the time constant can be set to).

Threshold setting fuse(s) 1014 can provide the threshold setting signal and allow the threshold setting signal to be tuned to provide the logic threshold of gate stage 108 (including, but not limited to, its various examples as discussed in this document) with a desired temperature coefficient. In various embodiments, the threshold setting signal is a binary code adjusted for the desired temperature coefficient by fuse trimming during manufacturing of the device including initial setting circuit 1004 and the timing circuit that receives the binary code. In one embodiment, threshold setting fuse(s) 1014 are each a non-volatile register, and the fuse trimming refers to the process of determining a value for the binary code and store the determined value in the non-volatile register(s). In various embodiments, the threshold setting signal can be an M-bit binary signal (providing $2^M$ initial values to which the logic threshold can be set to).

Figure 11:
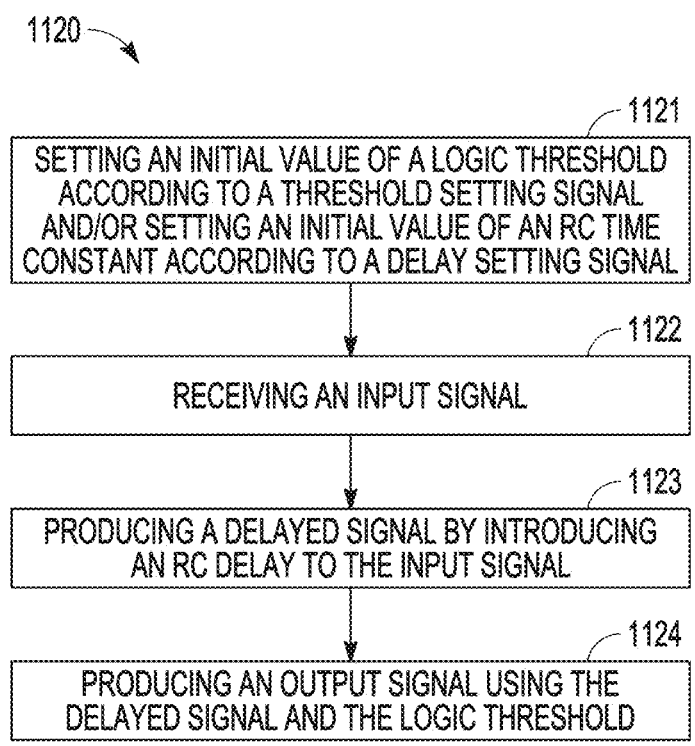
FIG. 11 is a flow chart illustrating an embodiment of a method for providing a timing signal with tuned temperature dependency.

FIG. 11 is a flow chart illustrating an embodiment of a method 1120 for providing a timing signal with tuned temperature dependency. In one embodiment, method 1120 is performed by a timing circuit, such as timing circuit 102 (including, but not limited to, its various examples as discussed in this document), that can be part of an electronic device or system that also includes a target circuit receiving and using an output of the timing circuit.

At 1121, an initial value of a logic threshold is set according to a threshold setting signal, and/or an initial value of an RC time constant ($\tau$=RC) is set according to a delay setting signal. Various embodiments use both the logic threshold and the time constant in producing the timing signal, with at least one of the logic threshold or the time constant being tunable by adjusting the initial value(s). An example of the timing signal is the output signal as illustrated in FIG. 2, which also shows the time constant and the logic threshold.

At 1122, an input signal is received. In various embodiments, the input signal is a binary signal, such as the input signal illustrated in FIG. 2.

At 1123, a delayed signal is produced by introducing an RC delay to the input signal. The time constant is a measure of that RC delay. In various embodiments, the delayed signal rises at the time constant in response to the input signal changing from "0" to "1", such as the delay signal illustrated in FIG. 2.

At 1124, an output signal is produced using the delayed signal and the logic threshold. In various embodiments, the output signal changes its logic level in response to the input signal changing its logic level with a time delay, such as the output signal and the time delay illustrated in FIG. 2. The time delay (and hence the output signal) has a temperature dependency that can affect, for example, an operation of the target circuit. The temperature dependency can be tuned by setting the initial value of the logic threshold and/or the initial value of the time constant according to a specified temperature dependency, such as using the method discussed below.

Figure 12:
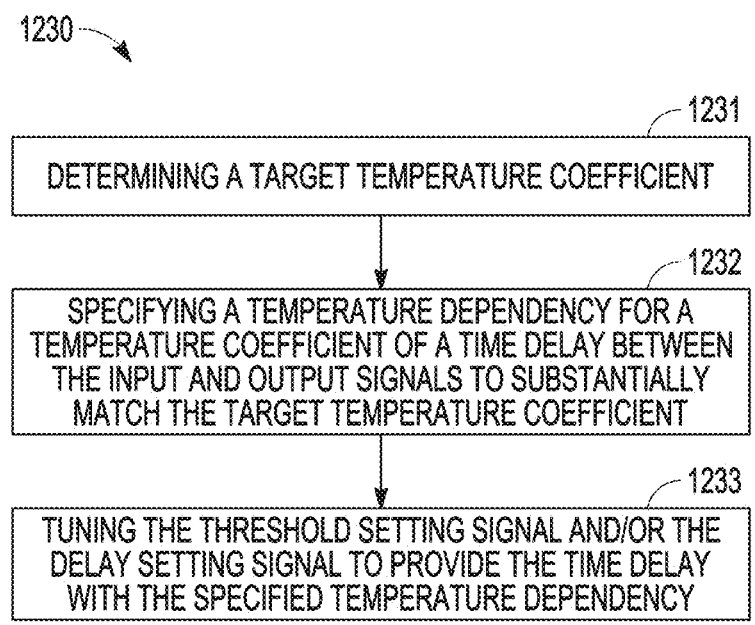
FIG. 12 is a flow chart illustrating an embodiment of a method for tuning a temperature dependency for a timing signal, such as to provide for the tuned temperature dependency of FIG. 11.

FIG. 12 is a flow chart illustrating an embodiment of a method 1230 for tuning a temperature dependency for the time delay (and hence the output signal) produced using method 1120 with the tuned temperature dependency in method 1120.

At 1231, a target temperature coefficient is determined. In various embodiments, the target temperature coefficient can be determined for a process of the target circuit that receives and uses the output signal.

At 1232, a temperature dependency is specified for a temperature coefficient of the time delay (between the input signal and the output signal) to substantially match the target temperature coefficient. For example, the temperature dependency can be specified as the temperature coefficient of the time delay with a tolerance range that is acceptable based on the performance requirement for the process of the target circuit.

At 1233, the threshold setting signal and/or the delay setting signal is/are tuned to provide the time delay with the specified temperature dependency. In various embodiments, the threshold setting signal and/or the delay setting signal are tuned under a test mode during manufacturing of the electronic device. The tuning process can include fuse trimming such that the threshold setting signal and/or the delay setting signal is/are permanently set as a result of the tuning process, and there is no need for post-manufacturing adjustment. The "fuse trimming" can refer to determining binary code(s) for the threshold setting signal and/or the delay setting signal and storing the determined code(s) in one or more non-volatile registers under the test mode. In various embodiments, the timing circuit is configured to allow for selection a temperature coefficient for the time delay from negative and positive temperature coefficients by tuning the threshold setting signal and/or the delay setting signal. The temperature coefficient for the time delay is an overall temperature coefficient of the timing circuit that is a function of the temperature coefficient of the logic threshold and/or the temperature coefficient of the delay signal (with either or both being tunable).

Figure 13:
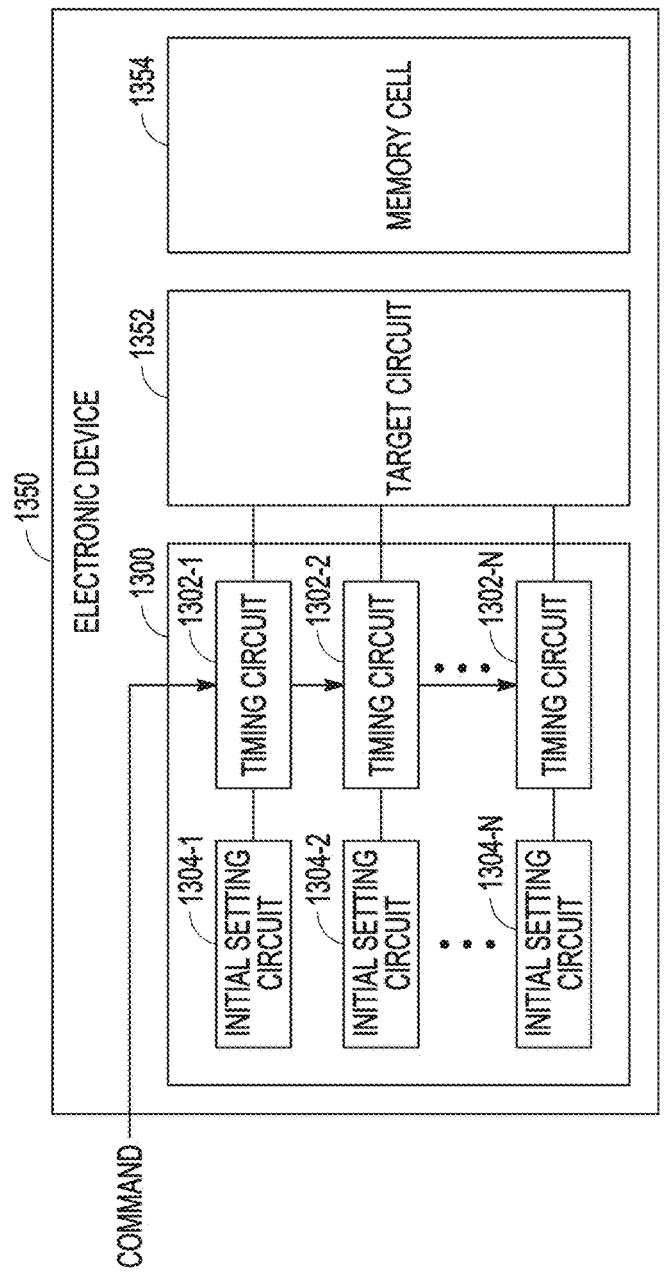
FIG. 13 is a block diagram illustrating an embodiment of an electronic device including the system for providing timing signals each having a tunable temperature dependency.

FIG. 13 is a block diagram illustrating an embodiment of an electronic device 1350 including a system 1300 for providing timing signals each having a tunable temperature dependency. System 1300 can represent an embodiment of system 100 with multiple timing circuits 1302 each coupled to one of multiple initial setting circuits 1304. Timing circuits 1302 (1302-1, 1302-2, . . . 1302-N) can each represent an example of timing circuit 102 (including, but not limited to, its various examples as discussed in this document). Initial setting circuits 1304 (1304-1, 1304-2, . . . 1304-N) can each represent an example of initial setting circuit 104 (including, but not limited to, its various examples as discussed in this document). Thus, an example of system 1300 includes multiple systems 100 (including, but not limited to, its various examples as discussed in this document).

Electronic device 1350 includes timing circuits 1302, initial setting circuit 1304, a target circuit 1352, and memory cells 1354. In various embodiments, electronic device 1350 includes a microelectronic device that requires critical timing signals for proper operations, such as a DRAM or FeRAM device, with memory cells 1353 including DRAM or FeRAM cells and optionally non-volatile registers (e.g., for storing the threshold setting signal and/or the delay setting signal).

Target circuit 1352 can receive the output signals from timing circuits 1302 and control an operation of electronic device 1350 using the output signals. Target circuit 1352 has a target circuit temperature coefficient that can be determined for specifying the temperature coefficient of the time delay of timing circuits 1302 (e.g., at 1231 of method 1230). In various embodiments, the temperature coefficients of the time delays of timing circuits 1302 are tuned during manufacturing of electronic device 1350, such as by performing method 1230. Then, timing circuits 1302 operate, such as by performing method 1120, when electronic device 1350 is used in its intended application(s). While FIG. 13 shows timing circuits 1302 arranged in parallel, in various embodiments, timing circuits 1302 can be connected in parallel and/or in series, depending on the timing signals needed.

Figure 14:
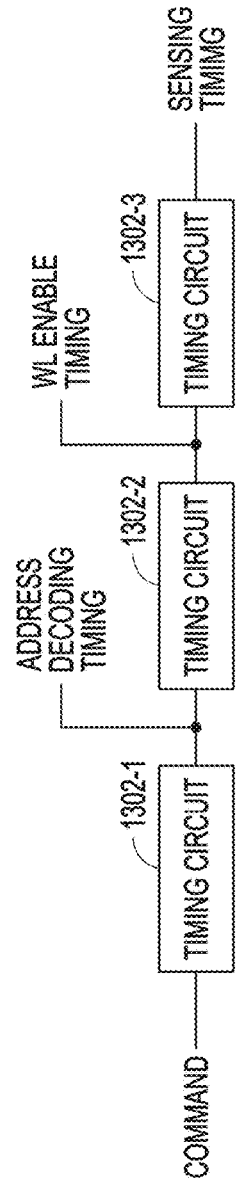
FIG. 14 is a block diagram illustrating an embodiment of portions of the system of FIG. 13 for generating exemplary timing signals.
Figure 15:
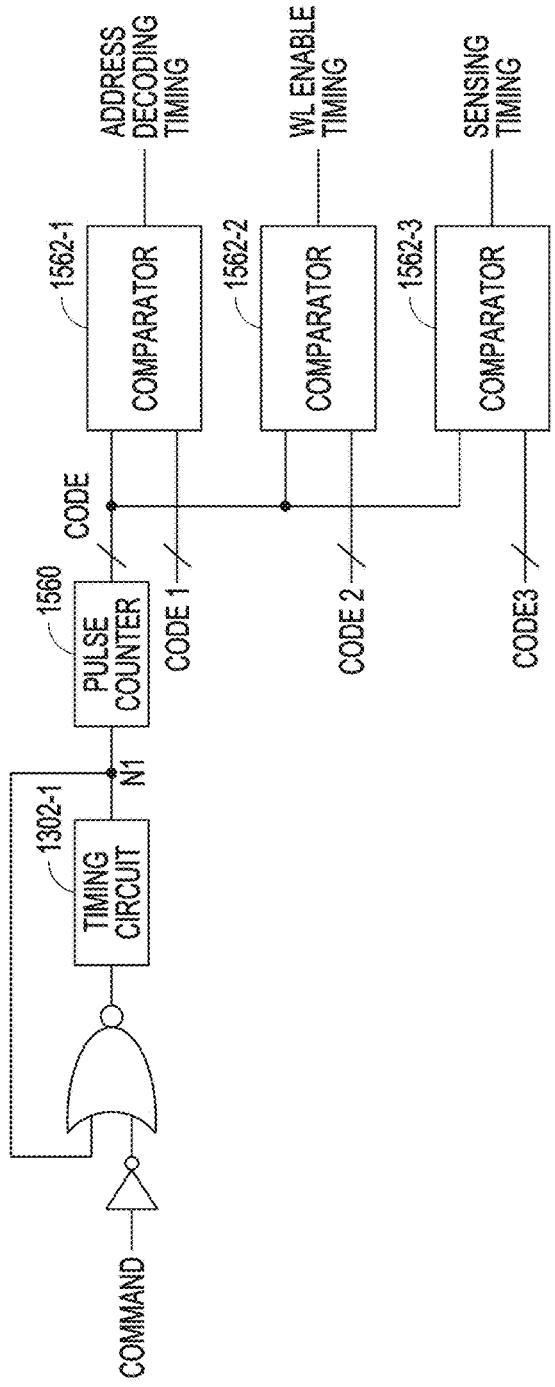
FIG. 15 is a block diagram illustrating another embodiment of portions of the system of FIG. 13 for generating the exemplary timing signals.

FIGS. 14 and 15 are each a block diagram illustrating an embodiment of portions of system 1300 for generating an address decoding timing signal, a word line (WL) enable timing signal, and a sensing timing signal when electronic device 1350 is a memory device, such as a DRAM or FeRAM device. In the embodiment illustrated in FIG. 14, timing circuits 1302-1, 1302-2, and 1203-3 are connected in series to control the time of onset of the address decoding timing signal in response to a timing command, the delay between the onsets of the address decoding signal and the WL enable timing signal, and the delay between the WL enable timing signal and the sensing timing signal, respectively. The embodiment illustrated in FIG. 15 provides an alternative embodiment in which a single timing circuit 1302-1 is used to generate the same timing signals.

Figure 16:
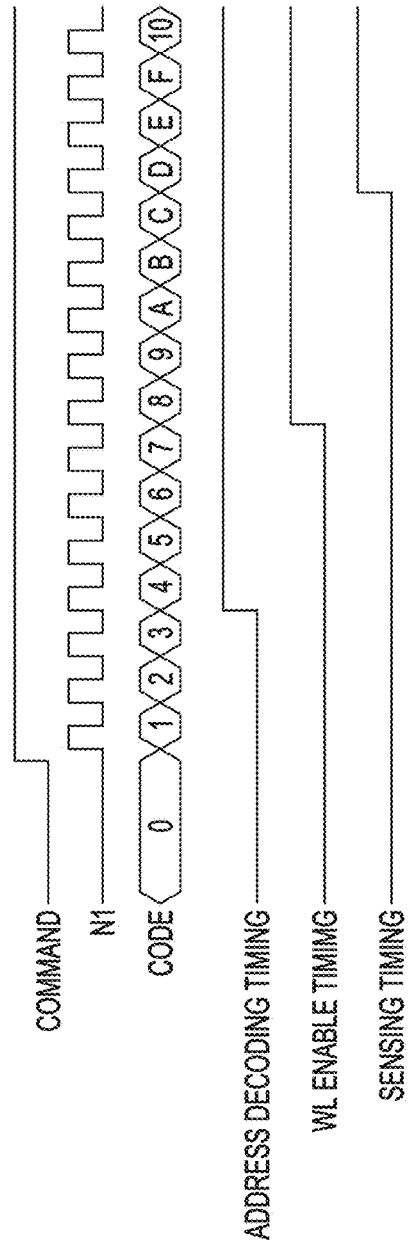
FIG. 16 is a timing diagram illustrating an embodiment of timing of various signals in the portions of the system of FIG. 15.

FIG. 16 is a timing diagram showing various signals in the embodiment illustrated in FIG. 15. In the embodiment illustrated in FIG. 15, in response to the timing command, timing circuit 1302-1 generates a train of pulses N1. A pulse counter 1560 receives N1 and counts the number of pulses and generates a code (CODE) representing the counted number. Comparators 1562 compares the code to multiple threshold codes and generates a timing signal when the code exceeds each threshold code. In the illustrated embodiment, a comparator 1562-1 compares the code to a first threshold (CODE1) and generates the address decoding timing signal when the code exceeds the first threshold, a comparator 1562-2 compares the code to a second threshold (CODE2) and generates the WL enable timing signal when the code exceeds the second threshold, and s comparator 1562-3 compares the code to a third threshold (CODE3) and generates the sensing timing signal when the code exceeds the second threshold. As illustrated in FIG. 16 as an example, the first, second, and third threshold codes are 4, 8, and D, respectively.

Some non-limiting examples (Examples 1-22) of the present subject matter are provided as follows:

In Example 1, a system for providing a timing signal with tunable temperature dependency in an electronic device, may include a timing circuit and an initial setting circuit. The timing circuit may be configured to receive an input signal and to produce an output signal by applying a time delay to the input signal, and may include a delay stage and a gate stage. The delay stage may be configured to produce a delayed signal by introducing a delay to the input signal. The gate stage may be configured to receive the delayed signal and a threshold setting signal, to produce the output signal using the delayed signal and a logic threshold, and to set an initial value of the logic threshold according to the threshold setting signal. The initial setting circuit may be configured to provide the threshold setting signal and to allow the threshold setting signal to be tuned for providing the time delay with a specified temperature dependency.

In Example 2, the subject matter of Example 1 may optionally be configured such that the delay stage is configured to produce the delayed signal by introducing a resistive-capacitive (RC) delay to the input signal, to receive a delay setting signal, and to set an initial value of a time constant according to the delay setting signal, the time constant being a measure of the RC delay, and the initial setting circuit is further configured to provide the threshold setting signal and the delay setting signal and to allow the threshold setting signal and the delay setting signal to be tuned for providing the time delay with the specified temperature dependency.

In Example 3, the subject matter of Example 2 may optionally be configured such that the timing circuit is configured to be tunable for providing the time delay with a negative temperature dependency by tuning at least one of the threshold setting signal or the delay setting signal.

In Example 4, the subject matter of Example 2 may optionally be configured such that the timing circuit is configured to be tunable for providing the time delay with a positive temperature dependency by tuning at least one of the threshold setting signal or the delay setting signal.

In Example 5, the subject matter of any one or any combination of Examples 2 to 4 may optionally be configured such that the initial setting circuit is further configured to allow the threshold setting signal and the delay setting signal to be tuned by fuse trimming.

In Example 6, the subject matter of Example 5 may optionally be configured such that the initial setting circuit includes one or more threshold setting fuses configured to produce the threshold setting signal, the one or more threshold setting fuses each including a non-volatile register.

In Example 7, the subject matter of any one or any combination of Examples 5 and 6 may optionally be configured such that the initial setting circuit includes one or more delay setting fuses to produce the delay setting signal, the one or more delay setting fuses each being a non-volatile register.

In Example 8, a microelectronic device may include a timing circuit, a target circuit, and an initial setting circuit. The timing circuit may be configured to receive an input signal and to produce an output signal by applying a time delay to the input signal, and may include a delay stage and a gate stage. The delay stage may be configured to produce a delayed signal by introducing a delay to the input signal. The gate stage may be configured to receive the delayed signal and to produce the output signal using the delayed signal and a logic threshold. The gate stage may include a threshold setting circuit configured to receive a threshold setting signal and to set an initial value of the logic threshold according to the threshold setting input. The target circuit may be configured to receive the output signal and to control an operation of the microelectronic device using the output signal. The target circuit has a target circuit temperature coefficient. The initial setting circuit may be configured to provide the threshold setting signal. The timing circuit and the initial setting circuit may be configured to allow the threshold setting signal to be tuned for providing the time delay with a timing circuit temperature coefficient that is substantially matched to the target circuit temperature coefficient.

In Example 9, the subject matter of Example 8 may optionally be configured such that the delay stage is configured to produce the delayed signal by introducing a resistive-capacitive (RC) delay to the input signal, to receive a delay setting signal, and to set an initial value of a time constant according to the delay setting signal, the time constant being a measure of the RC delay, and the initial setting circuit is further configured to provide the delay setting signal and to allow the threshold setting signal and the delay setting signal to be tuned for providing the time delay with the timing circuit temperature coefficient.

In Example 10, the subject matter of any one or any combination of Examples 8 and 9 may optionally be configured to further include memory cells configured to store data.

In Example 11, the subject matter of Example 10 may optionally be configured such that the memory cells include dynamic random access memory (DRAM) cells.

In Example 12, the subject matter of Example 10 may optionally be configured such that the memory cells include ferroelectric random access memory (FeRAM) cells.

In Example 13, the subject matter of any one or any combination of Examples 9 to 13 may optionally be configured such that the initial setting circuit includes non-volatile registers configured to allow the threshold setting signal and the delay setting signal to be set under a test mode during manufacturing of the microelectronic device and to store the set threshold setting signal and the set delay setting signal for post-manufactory operation of the microelectronic device.

In Example 14, the subject matter of any one or any combination of Examples 8 to 13 may optionally be configured such that the gate stage includes threshold setting circuitry including pull-up and pull-down transistors and configured to set the logic threshold according to the threshold setting signal.

In Example 15, a method for providing a timing signal with tunable temperature dependency in an electronic device is provided. The method may include receiving an input signal, producing a delayed signal by introducing a delay to the input signal, and producing an output signal switching to a different logic level in response to the delayed signal crossing a logic threshold. The output signal follows the input signal with a time delay. The method may further include setting an initial value of the logic threshold according to a threshold setting signal and tuning the threshold setting signal to provide the time delay with a specified temperature dependency.

In Example 16, the subject matter of introducing the delay as found in Example 15 may optionally include introducing a resistive-capacitive (RC) delay, and the subject matter of Example 15 may further include providing the RC delay using an RC delay circuit including a resistance and a capacitance to provide a time constant being a measure of the RC delay, at least one of the resistance or the capacitance being adjustable, setting an initial value of the time constant according to a delay setting signal, and tuning the threshold setting signal and the delay setting signal to provide the time delay with the specified temperature dependency.

In Example 17, the subject matter of Example 16 may optionally further include tuning the threshold setting signal and the delay setting signal under a test mode during manufacturing of the electronic device and setting each of the threshold setting signal and the delay setting signal to the tuned value permanently for post-manufacturing operations of the electronic device.

In Example 18, the subject matter of tuning the threshold setting signal and the delay setting signal as found in any one or any combination of Examples 16 and 17 may optionally include tuning the threshold setting signal and the delay setting signal comprises fuse trimming.

In Example 19, the subject matter of tuning the threshold setting signal and the delay setting signal as found in Example 18 may optionally include determining data to be stored in non-volatile registers in the electronic device under the test mode.

In Example 20, the subject matter of tuning the threshold setting signal and the delay setting signal to provide the time delay with the specified temperature dependency as found in any one or any combination of Examples 16 to 19 may optionally include selecting a temperature coefficient of the time delay from negative and positive temperature coefficients available by tuning the threshold setting signal and the delay setting signal.

In Example 21, the subject matter of any one or any combination of Examples 16 to 20 may optionally further include determining a target temperature coefficient for a process of a target circuit receiving the output signal and specifying the temperature dependency for a temperature coefficient of the time delay to substantially match the target temperature coefficient. The target circuit is part of the electronic device.

In Example 22, the subject matter of any one or any combination of Examples 15 to 21 may optionally further include using the output signal to control sensing timing in a memory device. The memory device is the electronic device or part of the electronic device.

The above detailed description includes references to the accompanying drawings, which form a part of the detailed description. The drawings show, by way of illustration, specific embodiments in which the invention can be practiced. These embodiments are also referred to herein as "examples". Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

It will be understood that when an element is referred to as being "on," "connected to" or "coupled with" another element, it can be directly on, connected, or coupled with the other element or intervening elements may be present. In contrast, when an element is referred to as being "directly on," "directly connected to" or "directly coupled with" another element, there are no intervening elements or layers present. If two elements are shown in the drawings with a line connecting them, the two elements can be either be coupled, or directly coupled, unless otherwise indicated.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A system for providing a timing signal with tunable temperature dependency in an electronic device, the system comprising:
    a timing circuit configured to receive an input signal and to produce an output signal by applying a time delay to the input signal, the timing circuit including:
        a delay stage configured to produce a delayed signal by introducing a delay to the input signal; and
        a gate stage configured to receive the delayed signal and a threshold setting signal, to produce the output signal using the delayed signal and a logic threshold, and to set an initial value of the logic threshold according to the threshold setting signal; and
    an initial setting circuit configured to provide the threshold setting signal and to allow the threshold setting signal to be tuned,
    wherein the timing circuit is configured to be tunable for providing the time delay with a negative temperature dependency by tuning at least one of the threshold setting signal or the delay setting signal and to be tunable for providing the time delay with a positive temperature dependency by tuning at least one of the threshold setting signal or the delay setting signal.

2. The system of claim 1, wherein the delay stage is configured to produce the delayed signal by introducing a resistive-capacitive (RC) delay to the input signal, to receive a delay setting signal, and to set an initial value of a time constant according to the delay setting signal, the time constant being a measure of the RC delay, and the initial setting circuit is further configured to provide the threshold setting signal and the delay setting signal and to allow the threshold setting signal and the delay setting signal to be tuned.

3. The system of claim 2, wherein the timing circuit is configured to be tunable for providing the time delay with a specified temperature dependency by tuning the threshold setting signal.

4. The system of claim 3, wherein the timing circuit is configured to be tunable for providing the time delay with the specified temperature dependency by tuning the threshold setting signal and the delay setting signal.

5. The system of claim 2, wherein the initial setting circuit is further configured to allow the threshold setting signal and the delay setting signal to be tuned by fuse trimming.

6. The system of claim 5, wherein the initial setting circuit comprises one or more threshold setting fuses configured to produce the threshold setting signal, the one or more threshold setting fuses each including a non-volatile register.

7. The system of claim 6, wherein the initial setting circuit further comprises one or more delay setting fuses to produce the delay setting signal, the one or more delay setting fuses each being a non-volatile register.

8. A microelectronic device, comprising:
a timing circuit configured to receive an input signal and to produce an output signal by applying a time delay to the input signal, the timing circuit including:
a delay stage configured to produce a delayed signal by introducing a delay to the input signal; and
a gate stage configured to receive the delayed signal and to produce the output signal using the delayed signal and a logic threshold, the gate stage including a threshold setting circuit configured to receive a threshold setting signal and to set an initial value of the logic threshold according to the threshold setting input;
a target circuit configured to receive the output signal and to control an operation of the microelectronic device using the output signal, the target circuit has a target circuit temperature coefficient; and
an initial setting circuit configured to provide the threshold setting signal,
wherein the timing circuit and the initial setting circuit are configured to allow the threshold setting signal to be tuned for providing the time delay with a timing circuit temperature coefficient that is substantially matched to the target circuit temperature coefficient.

9. The microelectronic device of claim 8, wherein the delay stage is configured to produce the delayed signal by introducing a resistive-capacitive (RC) delay to the input signal, to receive a delay setting signal, and to set an initial value of a time constant according to the delay setting signal, the time constant being a measure of the RC delay, and the initial setting circuit is further configured to provide the delay setting signal and to allow the threshold setting signal and the delay setting signal to be tuned for providing the time delay with the timing circuit temperature coefficient.

10. The microelectronic device of claim 9, further comprising memory cells configured to store data.

11. The microelectronic device of claim 10, wherein the memory cells comprise dynamic random access memory (DRAM) cells.

12. The microelectronic device of claim 10, wherein the memory cells comprise ferroelectric random access memory (FeRAM) cells.

13. The microelectronic device of claim 10, wherein the initial setting circuit comprises non-volatile registers configured to allow the threshold setting signal and the delay setting signal to be set under a test mode during manufacturing of the microelectronic device and to store the set threshold setting signal and the set delay setting signal for post-manufactory operation of the microelectronic device.

14. The microelectronic device of claim 13, wherein the gate stage comprises threshold setting circuitry including pull-up and pull-down transistors and configured to set the logic threshold according to the threshold setting signal.

15. A method for providing a timing signal with tunable temperature dependency in an electronic device, the method comprising:
receiving an input signal;
producing a delayed signal by introducing a delay to the input signal;
producing an output signal switching to a different logic level in response to the delayed signal crossing a logic threshold, the output signal following the input signal with a time delay;
providing a threshold setting signal;
setting an initial value of the logic threshold according to the threshold setting signal; and
tuning the threshold setting signal to provide the time delay with a temperature dependency,
wherein the threshold setting signal is tunable for providing the time delay with a negative time dependency and tunable for providing the time delay with a positive time dependency.

16. The method of claim 15, wherein introducing the delay comprises introducing a resistive-capacitive (RC) delay, and further comprising:
providing the RC delay using an RC delay circuit including a resistance and a capacitance to provide a time constant being a measure of the RC delay, at least one of the resistance or the capacitance being adjustable;
setting an initial value of the time constant according to a delay setting signal; and
tuning the threshold setting signal and the delay setting signal to provide the time delay with the selected temperature dependency.

17. The method of claim 16, further comprising:
tuning the threshold setting signal and the delay setting signal under a test mode during manufacturing of the electronic device; and
setting each of the threshold setting signal and the delay setting signal to the tuned value permanently for post-manufacturing operations of the electronic device.

18. The method of claim 17, wherein tuning the threshold setting signal and the delay setting signal comprises fuse trimming.

19. The method of claim 18, wherein tuning the threshold setting signal and the delay setting signal comprises determining data to be stored in non-volatile registers in the electronic device under the test mode.

20. The method of claim 16, wherein tuning the threshold setting signal and the delay setting signal to provide the time delay with the selected temperature dependency comprises selecting a temperature coefficient of the time delay from negative and positive temperature coefficients available by tuning the threshold setting signal and the delay setting signal.

21. The method of claim 16, further comprising:
determining a target temperature coefficient for a process of a target circuit receiving the output signal, the target circuit being part of the electronic device; and
specifying the temperature dependency for a temperature coefficient of the time delay to substantially match the target temperature coefficient.

22. The method of claim 16, wherein the electronic device comprises a memory device, and further comprising using the output signal to control sensing timing in the memory device.

* * * * *